Dec. 28, 1948.　　　　G. A. BORG　　　　2,457,633
SEALING DEVICE
Filed Feb. 21, 1946　　　　　　　　　　4 Sheets-Sheet 2
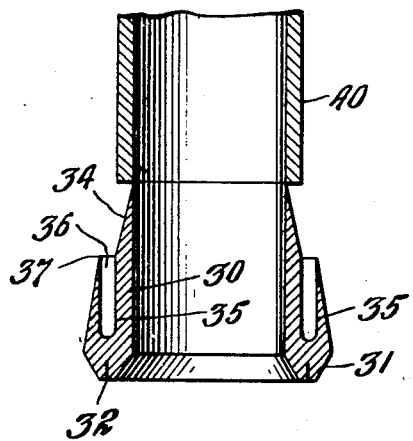
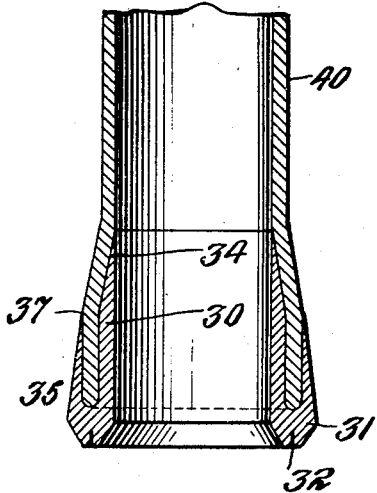
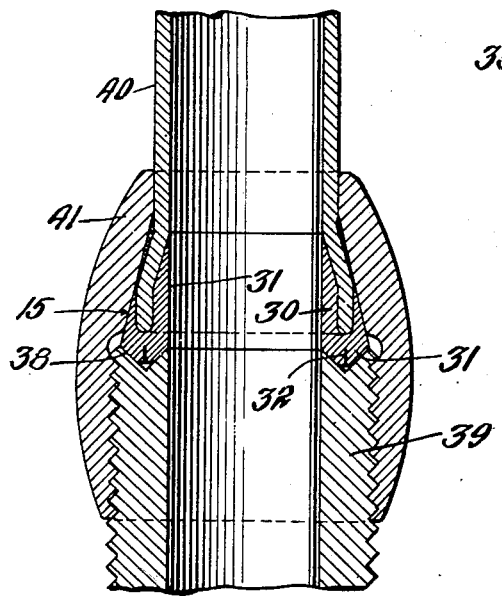
INVENTOR
GUSTAVE A. BORG
BY
　　ATTORNEY Dec. 28, 1948.   G. A. BORG   2,457,633
SEALING DEVICE
Filed Feb. 21, 1946   4 Sheets-Sheet 3
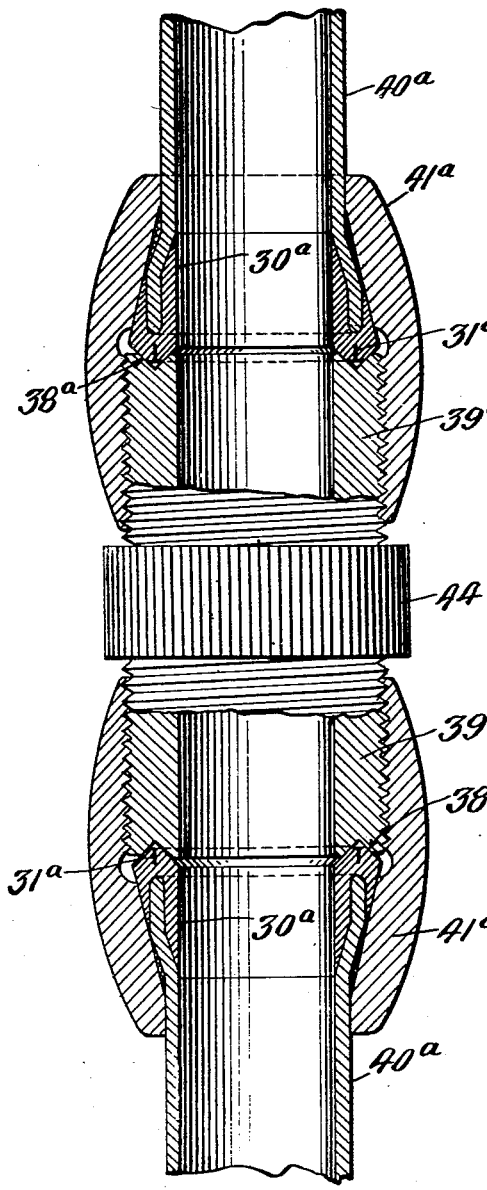
Fig. 7.
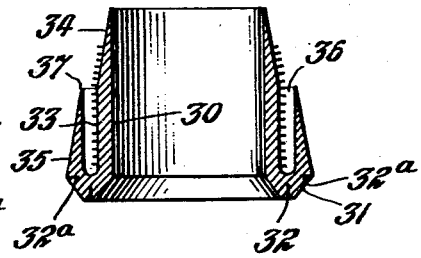
Fig. 8.
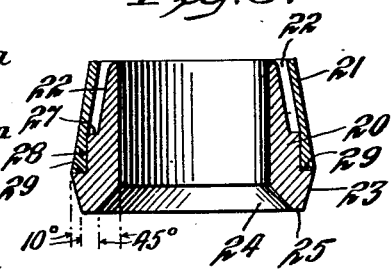
Fig. 9.
INVENTOR
GUSTAVE A. BORG
BY
ATTORNEY Dec. 28, 1948. G. A. BORG 2,457,633
SEALING DEVICE
Filed Feb. 21, 1946 4 Sheets-Sheet 4
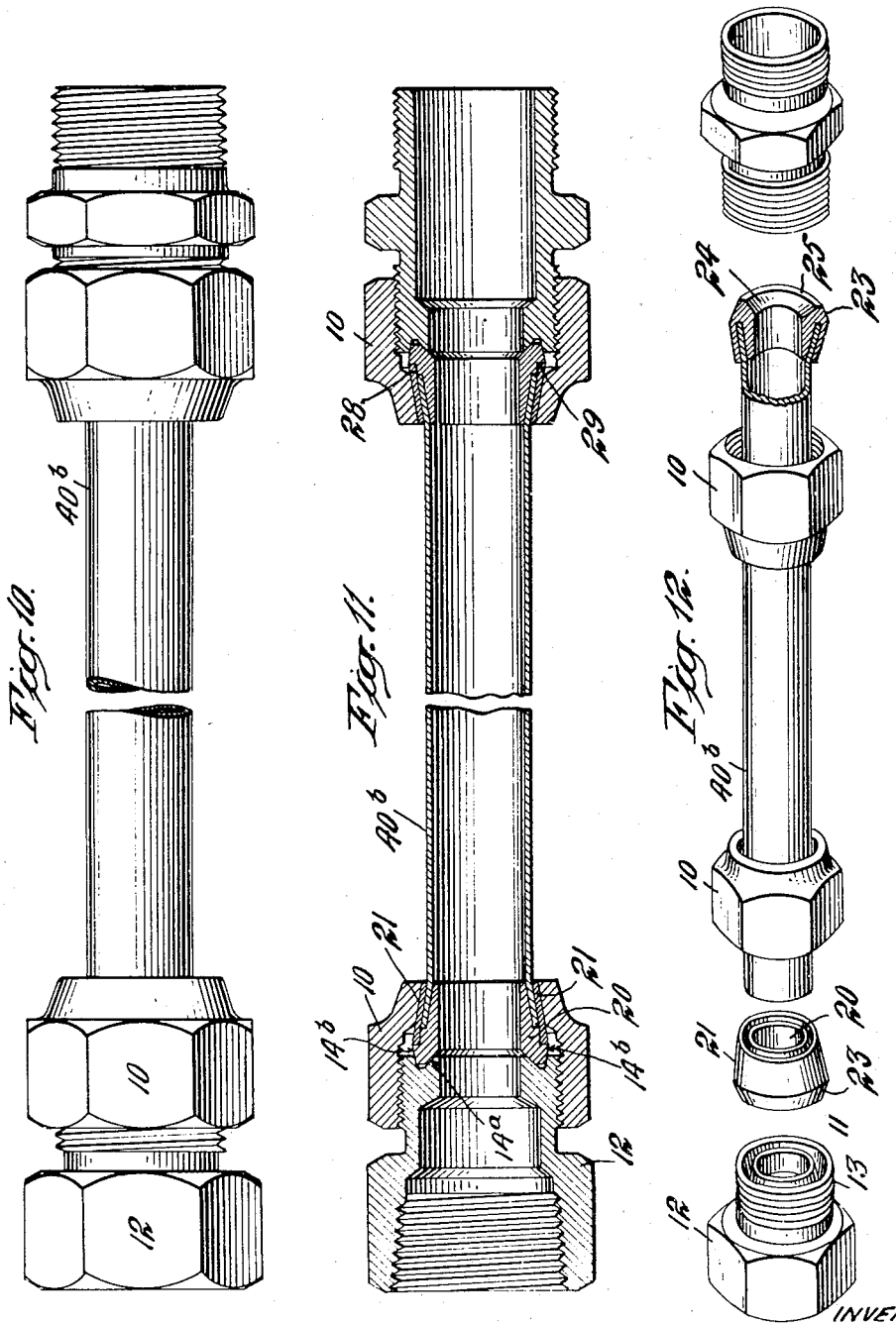
INVENTOR
GUSTAVE A. BORG
BY
ATTORNEY Patented Dec. 28, 1948

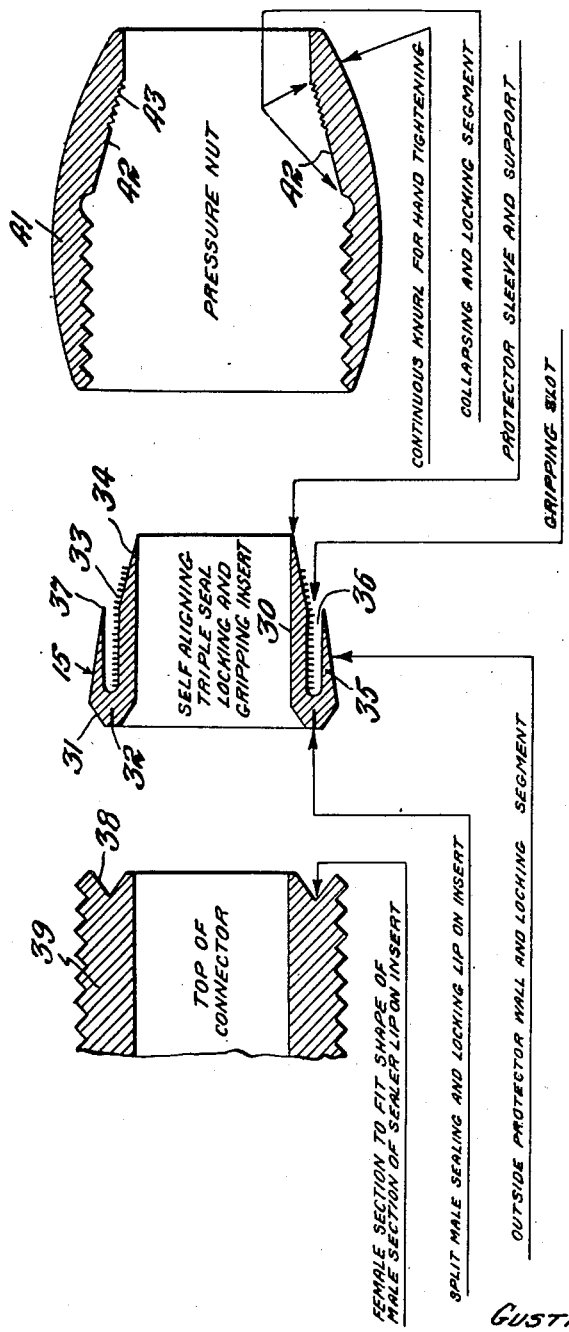

2,457,633

UNITED STATES PATENT OFFICE 2,457,633

SEALING DEVICE

Gustave A. Borg, Naugatuck, Conn.

Application February 21, 1946, Serial No. 649,168

7 Claims. (Cl. 285—86)

The invention relates to sealing devices, and, more particularly, to sealing devices designed for coupling purpose, such as connecting tubes to associated elements, such as, other tubes, receptacles, etc.

It is well known that the aforesaid devises, in addition to their other functions generally, are required to provide a leak-proof joint that will prevent leakage of the medium for which the associated elements are designed. The efficiency of devices of the class referred to as a whole, and with particular reference to the leak-proof properties thereof, is chiefly affected by strains resulting from a pulling, pushing or twisting action to which said devices may be exposed. Vibration developed during shipping and handling, or as a result of the installation and operation of the sealing device will also affect its efficiency. The effect of temperature changes upon the material of which the connected members or the medium conveyed by or contained in said members also tends to reduce both the sealing and coupling efficiency of such devices. The internal or external pressures or absence of said pressures to be maintained or provided against in the equipment of which the sealing device forms a part, also may reduce its efficiency.

Facility with which the sealing device may be used in making and repeatedly remaking connections will also have a bearing upon its effectiveness for its intended purpose. The general properties of the materials used in the device and the medium for which the installation is designed also may affect the efficiency of the connecting device. Finally, the permanency, the durability and the reliability of the connection desired are also factors which may bear upon the effectiveness of the device in question.

One of the most common types of connection involves the use of interlocking screw threads, in which case the effectiveness as a seal is directly dependent upon the accuracy of the threads. Any inaccuracies therein requires the use of gaskets, washers or joint sealing compounds of some description. Inasmuch as the threads, in such case, are cut into the members comprising the joint, up to forty per cent of the stock may be removed by this operation. This requires that the members in question be made up in an extra thickness to allow for the loss of material at the threads, and further provides an unnecessary amount of stock throughout the remaining length of the connecting member. This not only weakens the walls of the connecting members but in addition the threading operations entail considerable labor, etc., in field installations of threaded connections. In addition, this type of connection places a direct pressure or strain upon its component members, and entails considerable difficulty in disconnection and reconnection as the members must be twisted and moved about to break and make the joint.

It is common practice to use the so-called mechanical joint for connections wherein the connection and seal must be broken with little or no movement of the connecting elements. In this classification belong, for example, flanged and nut and nipple assemblies which involve machining and the use of gaskets and numerous studs, nuts and bolts, etc., as fasteners to complete the joints.

The nut and nipple type of device is commonly used in flared connections for the joining and sealing of tubing to tubing, tubing to a receptacle or tubing to a controlling mechanism. The standard in this type of connection over a long period of years has been the forty-five degree taper S. A. E. standard flare which presents numerous difficulties to offset its convenience and speed of installation.

For instance, the flared connection requires the use of a flaring tool which thins out the side wall in making the flare and at the same time crystallizes the material as a result of the strains developed during the flaring operation.

At the same time the stock is spread beyond the elastic limits of the materials resulting in micro-splits and defects and even in tube splitting, and it is practically impossible to make a plurality of uniform flares.

With this type of connection proper alignment of the connected members is difficult and often impossible, and the slightest movement of the nut ofttimes breaks the sealing pressure.

Furthermore, the seal is made by a direct shearing action upon the tube causing injury thereto and which is often sufficient to result in a defective connection which fails in use. In addition the connection and seal is made directly upon the tubing which accordingly is required to stand the use and abuse in making up the connection and in repeated disconnections and reconnections.

A variation of the nut and nipple connection is to be found in the compression gasket or ring type, in which the action of the nut over the nipple compresses the gasket or ring directly upon or into the unsupported tubing in making the seal. Also the gasket or ring is distorted in making the seal, and a new one is usually required. This arrangement repeats the objections incidental to the flared fitting in placing a connecting strain in addition to a sealing action directly upon the tubing or its equivalent. The desirability and use of such direct pressure type of connectors is accordingly limited.

From the above it is clear that the provision of a connecting device of maximum efficiency and usefulness presents a real problem. This is particularly true in the field of plastics.

The invention has for its object to provide a novel sealing device capable of functioning also as a connecting device which overcomes existing objections and disadvantages and which has wide adaptability in use.

The invention contemplates further the provision of a novel sealing device which does not require the use of cumbersome and conventional tools, such as wrenches, dies, etc., in the field or elsewhere, and which develops no direct connecting strain upon the tubing or its equivalent, and which causes no injury thereto during use or otherwise, whereby it is possible to use the novel sealing device indefinitely.

A further object of the invention is the provision of a novel sealing device which develops a strong and efficient seal and which gives mechanical action in operation, and which does not require the pressure of wrench leverage to make a seal, but can accomplish this by hand-type pressure.

The invention seeks in addition to provide a novel sealing device having greatly increased connecting surfaces and sealing elements, and which is easy to produce and simple to install even in the field.

A still further object of the invention is the provision of a novel sealing device which is self-aligning; and which produces increased strength and protection at the point of connection, and which also is locking in action.

Furthermore, the invention seeks to provide a novel sealing device having an inherent flexibility to produce a floating or breathing action for absorbing vibration and other disturbing forces, i. e., cold flow.

The invention has the additional purpose of providing a novel sealing device which may be produced in a wide range of materials and which is especially capable of being made in an efficient form from plastics, etc.

Other objects will appear from the description hereinafter and the features of novelty will be pointed out in the claims.

In the accompanying drawings, which illustrate examples of the invention without defining its limits.

Fig. 1 is a sectional view of the locking and gripping member included in the novel sealing device;

Fig. 2 is a fragmentary section illustrating an associated feature of said device;

Fig. 3 is a sectional view of a pressure nut forming part of said novel sealing device;

Fig. 4 is a sectional view showing the locking and gripping member of the novel sealing device in position for combination with a tube;

Fig. 5 is a corresponding view showing the said locking and gripping member combined with said tube;

Fig. 6 is a sectional view illustrating the novel sealing device in use for connecting said tube with an associate element such as a pipe, etc.;

Fig. 7 is a sectional view of another possible form of the device;

Fig. 8 is a sectional view similar to Fig. 1 of a modification.

Fig. 9 is a sectional view of a further modification involving a two-piece insert.

Fig. 10 is a side elevation illustrating a tube connected to a male fitting at one end and a female fitting at the other.

Fig. 11 is a vertical central section of Fig. 10 and

Fig. 12 is an exploded view of the part shown in Figs. 10 and 11, except the insert is illustrated as an integral one-piece unit.

For the purpose of describing the novel sealing device I have illustrated it in Figs. 1, 2 and 3 in a form designed for coupling two elements such as a tube and a pipe or another tube together in axial continuity. It is to be distinctly understood that this illustration is not to be construed as defining the limits of usefulness of the novel device, and that it has been selected merely to show the utility of the device in a field for which it is particularly adapted.

It is to be further understood that the novel sealing device inherently possesses the properties of gripping, uniting, sealing, joining and locking. These properties constitute factors essential to maximum efficiency in sealing and connecting many types of elements, as will be readily understood from a description of the construction and action involved in joining together circular elements as exemplified by tubing and pipes.

In the form illustrated in Figs. 1 to 6 inclusive, the novel device comprises a self-aligning triple seal and triple locking and gripping member or insert comprising a tubular body 30 having a shoulder 31 at its one end of tapering or other suitable form provided with a cut or slit 32 in its end face. The shoulder 31 and the slit 32, or either of them may be continuous and follow the cross-sectional form of the device or if the latter is of interrupted shape the shoulder and slit will correspond thereto. The body 30 is formed with an external straight section 33 preferably roughened as by being provided with suitable self-cutting threads, and a continuing beveled section 34 tapering to a relatively sharp edge 37 at the opposite end of said body 30 as shown in Fig. 1. An outside projecting section or wall 35 extends from the annular shoulder 31 in the direction of the axis of the body 30 and has its inner surface in spaced concentric relation with the circular section 33 to form an annular gripping slot 36 provided with an open entering end. This projecting section or wall 35 constitutes a protective sleeve, locking section and gripping member. The external surface 15 of the section or wall 35 is beveled and connects with the inner concentric surface to form a relatively sharp edge 37 which is concentric with the section 33 of the body 30. The tapered concentric outer protecting section or wall 35 preferably terminates at a point intermediate of the opposite ends of the body 30 so that the open entering end of the gripping slot 36 is located approximately at the point of connection of the sections 33 and 34. The shoulder 31 preferably is adapted to fit into and co-operate with a mating groove 38 formed in the end of the tube, pipe or other element 39 to which the tube 40 is to be coupled. A pressure nut 41 internally threaded for connection with the externally threaded tube or pipe 39 constitutes the medium whereby the connection of the tubes 39 and 40 is completed. This pressure nut 41 is internally threaded throughout only a part of its axial length and throughout the remainder of its axial length is internally provided with an inclined or tapered surface section 42 constituting a swedging-in and locking section as will appear more fully hereinafter.

In practice the tube 40 is placed at the entrance of the slot 36 and the two are brought together until the tube 40 rests at the base of the slot 36 as shown in Fig. 5. This may be accomplished by pressing the tube 40 directly into the slot 36 giving a strong friction fit and seal. A twisting or circular screw-like action in conjunction with the self-cutting action of the thread or other roughening made upon the external circular section 33 of the body 30 will also give a strong friction fit and seal. Further, it will hold or lock the tube 40 in place in the slot 36 by the thrust action between the threads or other roughening and the engagement of the tube 40 with the base of the slot 36. It may be necessary in certain installations to unite the tube 40 to the above-described protective member or insert through the use of cement, solder, weld, or thermal process. Once the member or insert is in its proper position upon the tube 40, the body 30 which constitutes an internal sleeve or wall acts as a strengthener or support for the tube 40 at the connected end thereof as clearly shown in Figs. 5 and 6. The affixing of the tube 40 over and upon the internal sleeve is effected by means of a suitable taper or radius exemplified by the beveled section 34, and the degree of frictional fit and seal possible within the elastic limits of the tube 40, is dependent upon the outer diameter of the internal sleeve in relation to the inner diameter of the tube 40. The combination of the tube 40 with the sealing device results in enlarging the diameter of that part of the tube 40 which finally is located in the slot 36 upon the straight section 33, or in other words, develops an enlarged opening in that part of said tube 40, as clearly illustrated in Figs. 5 and 6. If the inner diameter of the insert is made to correspond with the inner diameter of the tube 40, the result will be one continuous opening or channel providing a streamlined, smooth effect or surface, and reducing to the point of elimination all obstructing projections tending to develop baffling and turbulence, and maintaining the hydraulically smooth interior surface wherein lies a principal advantage of tubing etc. In cases where the above condition is desired the tube 40 will be expanded to an extent corresponding to the thickness of the internal wall or body 30 of the insert or member. This is accomplished as the tube 40 slides up over the taper or beveled section 34 and onto the straight section 33 of the internal sleeve of the body 30 as illustrated in Fig. 4. The arrangement of the sealing device and its combination with the tube 40, or its equivalent, contributes to the development of maximum resistance to separation under a pulling force commonly known as "pull-out."

Furthermore, the combination shown in Fig. 5 is capable of resisting or containing extreme pressures independently of any extraneous assistance.

In addition, the novel device, when in use is subject to no distortion pressures or forces and consequently is capable of repeated use without any reduction in its efficiency.

The one end of the body 30 comprises the annular shoulder 31 divided in two by the circular slit 32 which gives the effect of two sealing segments. The split shoulder 31 is made into a taper, square, round, oval, or any desired odd shape, dependent upon the degree of seal desired, the amount of stock available in the connecting members, and their type or design. These two sealing segments both increase the area of the sealing surface and provide proper mating surfaces for a superior seal of maximum efficiency. In the case of a special shape of some widely used product or special installation requiring a sealed connection, these sealing segments may be designed to give a corresponding contour and thus provide the same degree of fit and sealing action.

When the insert is in proper place upon the end of the tube 40 it is brought up against a threaded connection or fitting preferably adapted as a connecting member and exemplified by the tube or pipe 39 which has the annular groove 38 to match the annular shoulder 31. The cooperating shoulder 31 and groove 38 provide a sealed joint which is capable of being instantly connected and repeatedly reconnected without affecting the efficiency of the device. These arrangements of male shoulders and corresponding female grooves may be made with or without either one containing the above-described slit, and the remaining member or locking segment may be solid. In addition, in installations where a very strong seal is required, combined male and female shoulders and grooved sections may be used.

To complete the coupling operation the pressure or connecting nut 41, which previously has been placed over the end of the tube 40 before the protecting insert or sleeve is combined therewith, is threaded upon the threaded connecting member or pipe 39 above mentioned. As the nut 41 is drawn up into operative position five distinct actions take place in different parts of the connection, as illustrated in Fig. 6.

1. The inclined or tapered surface section 42 inside the nut 41 makes contact with the beveled external surface 15 of wall 35 of the insert and the nut 41 also begins to grip the threaded tube 39. When the nut 41 is fully advanced into operative position, the gripping action is completed and a second seal around the tube 40 is effected. At this stage the latter is secured in the slot 36 and a wide sealing area has been provided both internally and externally by the mating surfaces of the tube 40 and the insert, and at the same time the insert is fixed in a locked position by the tightening action of the nut 41.

2. As the nut 41 advances it thrusts the insert against the pipe or connecting member 39 causing the annular shoulder 31 to forcibly enter the female annular groove 38. This action causes the split members of the male shoulder 31 to press against the side walls of the female groove 38 giving a strong seal.

3. When the shoulder 31 seats itself at the base of the groove 38, a backward thrust takes place against the forward thrust of the nut 41 thereby developing an efficient locking action. Furthermore, the split 32 increases the elastic limit of the material to further provide a strong gripping and sealing action. It also provides an arrangement having an inherent cushioning effect to absorb vibration, etc., and aids in developing a floating or breathing action between the nut 41, insert 30 and connecting member 39.

4. When the nut 41 has reached its operative or locked position, the gripping ridges 43 in the form of rings, teeth, threads, or knurls upon the tapered inside section 42 of the nut 41 have come into contact with the tube 40 just behind the swedged-in outer wall of the insert and press against the tubing. This further locks the tube 40 in the slot 36 and against the beveled or tapered section 34 of the internal wall or sleeve of the insert. In addition, the nut 41 in its final position constitutes a protecting enclosure and within which the locking and sealing elements are free to operate. Furthermore, the locking, sealing, and protecting features of the present sealing device make it safer to use and make it possible to use lighter gauge tubing with thinner wall thicknesses as there is no cutting away as in ordinary threaded pipe or thinning out as in the conventional flaring of the usual flared tubing.

5. Finally, as the nut 41 advances over the threaded connecting member 39 and particularly in the case of a tapered thread as in a pipe thread, it expands the lip of the nut 41 causing a gripping action, and locking the nut 41 upon the connecting member 39 against unintentional displacement. In special installations the lip of the nut 41 may be slotted or split lengthwise for a short distance to add to the elasticity of the material of said nut 41, thereby further assisting the gripping and locking action thereof. Thus, the entire assembly is contained within a self-aligning triple locked, triple sealed, floating or breathing, universal, flexible connection as shown in Fig. 6.

In Fig. 7 the novel device is shown in a form designed primarily for coupling two elements, such as two tubes, together in axial registration. The illustrated arrangement includes a connecting member comprising an intermediate preferably knurled annular rib 44 from which externally-threaded connectors 39—a project in opposite directions in axial alignment with each other. The opposite end surfaces of the connectors 39—a are formed with annular grooves 38—a corresponding to the groove 38 of Figs. 2 and 6, and designed to receive the respective annular shoulders 31—a of the gripping members or inserts 30 of Figs. 1, 4, 5 and 6 in form and construction, and are correspondingly combined with the tubes 40—a or their equivalent. In addition two pressure nuts 41—a similar to the pressure nut 41 previously described and shown in Figs. 3 and 6 are provided for completing the connection.

In utilizing this form of the novel device, the pressure nuts 41—a having previously been combined with the tubes 40—a, and the inserts then applied to the ends of such tubes, the annular shoulders 31—a of the inserts 30—a are fitted into the grooves 38—a of the connectors 39—a. The pressure nuts 41—a are then screwed home upon the connectors 39—a in the same manner and with the same results as described hereinbefore with respect to Figs. 1 to 6 inclusive.

For special applications the slits 32 providing the two locking segments in Figs. 1, 4, 5 and 6, may be supplemented with circumferential slits 32—a cut into the internal or external walls of the insert as shown in Fig. 8 to thereby add to the yieldability of the insert.

These shoulders, grooves and slots may be located in various positions to give the desired sealing and joining effect. In the case of totally new products or special applications, i. e., where a stop is to be placed upon the entrance to a containing unit, the insert may be manufactured as part of the joining members and then becomes like a yielding cork with a sealing device in the form of the remaining shoulder, groove, or slot.

A modified form of the insert is shown in Fig. 9, this form of the invention differing essentially from the other forms in that it comprises a two piece construction.

The tubular body 20 is provided with a surface 24 on the sealing shoulder, this surface extending preferably at an angle of 45°. A radially extending end face 26 is provided at the extreme end of the sealing shoulder and from this extends rearwardly another angular surface 23 which preferably makes a smaller angle say about 10° or about 15° or so with the axis than the surface 24. A stop shoulder or abutment 29 is provided in order to afford a seat for the thin outer clamping member of thimble 21. A cylindrical surface 28 extends between the shoulders 29 and 27 and when the thin outer clamping member or thimble 21 is received upon the tubular body 20, a recess 22 is formed which is adapted to receive the end of the tubing. The recess or groove 22 is herein illustrated as preferably being inclined throughout its length or extent without any substantial straight portion as illustrated in Fig. 8.

In operation, thimble 21 preferably, is first seated upon the tubular body 20 as shown in Fig. 9, after which the tubing is inserted in the recess 22 in the manner described in connection with the preceding figures. In Figs. 10 to 12 the modified form of insert is shown as being connected to male and female fittings, thus joining the tube 40—b to such fittings.

It will be noted from the inspection of Figs. 10–12 that the outer clamping member 10 rides upon the thin clamping sleeve 21 and does not contact the tubing 40—b. This provides a perfect seal without damage to the tubing 40—b, or without in any way weakening the tubing 40—b. The clamping member 10 is screw threadedly received upon the fitting which is provided with a mating groove having an inner sealing shoulder 14a corresponding to a standard 45° S. A. E. fitting, and having an outer sealing shoulder 14b having a smaller angle, say about 10° or about 15° or so. By providing this construction, the present improved sealing device may be used with any standard fitting now available or in service having a standard S. A. E. 45° angle, thus making it unnecessary to use a fitting with a special V-shaped groove as illustrated in the drawings and described herein and thus giving complete interchangeability with existing fittings.

In Figs. 10 and 12, it will be observed that there is a male fitting at one end and a female fitting at the other. Of course, any appropriate or suitable fitting may be used as one skilled in the art will readily understand.

The insert is illustrated in Fig. 12 as an integral unit. In certain instances, it is preferred to use a unitary insert. The recess or groove is cut so that the outer thimble is straight and parallel with inner wall of the body 20. By rolling the outer thimble inwardly, it can be brought into practically parallel relation to the inclined inner cut within the recess or groove as may be clearly seen in Fig. 12. In practice, the rolling operation work hardens the metal and makes it tough and hard and enables it to resist the stresses to which it is subjected when the end of tubing is inserted and is driven into place during the fabricating and assembly operation.

The parts have been fully described hereinbefore and such description need not be repeated inasmuch as the same operations are involved. I have found, however, that a two piece insert is less expensive than a one piece insert for at least two reasons. There is some loss of metal when the recess 36 is formed in the insert shown in Figs. 1 to 8. Furthermore, it is somewhat expensive to cut the recess 36 into the insert. In the two piece construction there is no loss of metal and no expensive cutting operation.

The insert and the connecting members, if desired, may be of a wide variety of materials, plastics, metal, wood, rubber, fiber, synthetics, paper, ceramics, glass, etc., or combinations of these.

The manner in which the seal and connection is made by means of the novel sealing device reduces to a minimum or entirely eliminates cold flow which is a chief objection to the use of thermoplastics for this purpose.

The novel device comprises an element that enters into a connection between the joining members and which, for the want of a better word, may be called a combined collar and insert. It can be inserted into either one or both of the joining members, or again, either one or both of the joining members may be inserted into this sealing element as may be needed. After the sealing device has been assembled on the end of tubing, pipe or the like, it can be connected, disconnected, and reconnected as many times as desired or needed without detrimentally affecting the effectiveness of the device. In actual tests with tubing having a novel sealing device on one or both ends of the tube, it was demonstrated that the tubing bursted under pressures of many thousands of pounds per square inch without the novel sealing device even leaking. Such tests prove the meritorious nature of the novel sealing device and the effectiveness of the joint.

It has specifically for its purpose the increasing of the efficiency of a seal by eliminating any injury, distortion or reduction of the strength of the joining members and further it, first, improves the seal by providing increased areas of contact and sealing; second, provides a breathing or floating action to withstand vibration, and finally, a stop or locking action to all seals or sealing connections.

This sealing and locking collar-insert is adapted for use with many existing sealing and connecting devices by a slight modification, and it is further adaptable to many new uses where the joining elements are designed to work in mechanical harmony with the collar-insert.

In handling large size pipes and tubes, the present sealing device is especially useful. It will enable the art to fabricate, install or lay pipes or tubes faster than heretofore and without the necessity of using welding, brazing, soldering or otherwise permanently joining the ends of such tubes or pipes. For instance, when large steel tubes or pipes are being installed or laid for use as oil lines, steam lines, water lines or other liquid or gas lines, the ends of the tubes or pipes can be heated, preferably at least red hot, and can be forced into the insert of the new sealing device. In forcing the heated end in the insert, the latter tends to act like a forming die. It flares the tube or pipe and expands it radially so that it is tapered like a frustrum of a cone. Due to the metal being in a heated condition, it "flows" easily into the recess or groove in the insert and makes a good joint therewith. When the heated tube or pipe cools, it forms a shrink fit with the insert and makes a practically integral or unitary structure. By mounting an insert on the ends of two pipes or tubes, which are to be joined, they can be united in the manner as shown by Fig. 7. When the size of the tubes or pipes is too large for the use of threads, flanges can be used as readily understood by those skilled in the art. Thus, threads would not have to be provided with regular mating flanges. By putting bolts thru the mating flanges, they could be drawn up and locked in position with nuts in the conventional manner. In other words, a new method of joining tubes or pipes is provided which eliminates the necessity of using welding, brazing, soldering, or otherwise permanently joining such tubes or pipes. Of course, the inserts can be made of alloy steel with any appropriate toughness, hardness and other suitable properties well known to metallurgists or others skilled in the art. It is likewise to be noted that metals and alloys other than steel and plastics may be handled and treated in the foregoing manner and the amount and temperature of heating would depend upon the metal, alloy or plastic under treatment as well known by those skilled in the art.

It is to be observed that the present invention provides a sealing device of the kind described for tubing or the like comprising a body having an axially tapering end section adapted for insertion into an end of a tubing to outwardly flare the same and to receive the outwardly flared end of said tubing under radial tension, sealing means at the other end of said body cooperating with an associate coupling element to effect a seal therewith, a relatively thin outer clamping member extending toward said first end of said body and in external surface engagement with the outwardly flared end of said tubing and cooperating therewith to develop a clamping force on said tubing, and a clamping sleeve adapted for connection with said associate element and having an internal camming surface cooperating with the outer surface of said clamping member to force the latter inwardly against the outwardly flared tubing.

Furthermore, the present invention provides a sealing device of the kind described for tubing or the like comprising a body having an axially progressively tapering section adapted for insertion into an end of a tubing to outwardly expand the same and to receive said expanded end of the tubing under radial tension, sealing means at an end of said body cooperating with an end of an associate element to effect a seal, an outer clamping member extending from said end in external surface engagement with the outwardly expanded end of said tubing and cooperating with said body section to develop a clamping force on said tubing, and a clamping sleeve adapted for connection with said associate element and having an internal camming surface cooperating with the outer clamping member to force the latter inwardly against said outwardly expanded tubing.

Moreover, the present invention provides an improvement in a sealing device of the kind described for tubing or the like, including a body having an axially tapering section for insertion into an end of a tubing to outwardly flare the same, sealing means at an end of said body adapted to cooperate with an end of an associate element to effect a seal, and an outer clamping member extending from said sealing means in annular spaced relation with said tapering section to provide an annular gripping slot for the flared end of said tubing.

This application is a continuation in part of my application Serial No. 496,776, filed July 30, 1943, and entitled Sealing devices, now abandoned.

Although the present invention has been described in conjunction with preferred embodiments, it is to be understood that modifications and variations may be resorted to without departing from the spirit and scope of the invention as those skilled in the art will readily understand. Thus, for example, the nut can be made in any appropriate form or shape or can be provided with any appropriate apertures, holes, slots, or the like for engagement with a fitting tool, as those skilled in the art will readily understand. Such variations and modifications are considered to be within the purview and scope of the claims.

I claim:

1. A sealing device of the kind described for tubing or the like comprising a body having an axially tapering end section adapted for insertion into an end of a tubing to outwardly flare the same and to receive the outwardly flared end of said tubing under radial tension, sealing means at the other end of said body cooperating with an associate coupling element to effect a seal therewith, a relatively thin outer clamping member extending toward said first end of said body and in external surface engagement with the outwardly flared end of said tubing and cooperating therewith to develop a clamping force on said tubing, and a clamping sleeve adapted for connection with said associate element and having an internal camming surface cooperating with the outer surface of said clamping member to force the latter inwardly against the outwardly flared tubing.

2. A sealing device of the kind described for tubing or the like comprising a body having an axially progressively tapering section adapted for insertion into an end of a tubing to outwardly expand the same and to receive said expanded end of the tubing under radial tension, sealing means at an end of said body cooperating with an end of an associate element to effect a seal, an outer clamping member extending from said end in external surface engagement with the outwardly expanded end of said tubing and cooperating with said body section to develop a clamping force on said tubing, and a clamping sleeve adapted for connection with said associate element and having an internal camming surface cooperating with the outer clamping member to force the latter inwardly against said outwardly expanded tubing.

3. The improvement in a sealing device of the kind described for tubing or the like, including a body having an axially tapering section for insertion into an end of a tubing to outwardly flare the same, sealing means at an end of said body adapted to cooperate with an end of an associate element to effect a seal, and an outer clamping member extending from said sealing means in annular spaced relation with said tapering section to provide an annular gripping slot for the flared end of said tubing.

4. The improvement in a sealing device of the kind described for tubing or the like, including a body having an axially tapering section for insertion into an end of a tubing to outwardly flare the same, sealing means at an end of said body adapted to cooperate with an end of an associate element to effect a seal, said sealing means provided with an inner sealing shoulder having a 45° angle and also provided with an outer sealing shoulder having a smaller angle whereby a seal may be made with a standard 45° fitting and with a fitting having a V-shaped mating groove and an outer clamping member extending from said sealing means in annular spaced relation with said tapering section to provide an annular gripping slot for the flared end of said tubing.

5. As an article of manufacture, a sealing device such as set forth in claim 1 wherein the relatively thin outer clamping member is separable from said body.

6. As an article of manufacture, a sealing device such as set forth in claim 2 wherein the outer clamping member is separable from said body.

7. As an article of manufacture, a sealing device such as set forth in claim 3 wherein the outer clamping member is separable from said body.

GUSTAVE A. BORG.

REFERENCES CITED

The following references are of record in the file of this patent:

UNITED STATES PATENTS

| Number | Name | Date |
|---|---|---|
| 172,470 | Morse | Jan. 18, 1876 |
| 1,693,838 | Faudi | Dec. 4, 1928 |
| 1,862,833 | Stover | June 14, 1932 |
| 1,951,860 | Cowles | Mar. 20, 1934 |
| 2,230,115 | Kreidel | Jan. 28, 1941 |

FOREIGN PATENTS

| Number | Country | Date |
|---|---|---|
| 352,304 | Great Britain | July 9, 1931 |